Aug. 31, 1965 R. J. KOTIS 3,203,132
ARTIFICIAL FISH LURE
Filed Oct. 9, 1961

INVENTOR.
Richard J. Kotis
BY
William Cleland
Attorney

United States Patent Office 3,203,132  
Patented Aug. 31, 1965

3,203,132  
ARTIFICIAL FISH LURE  
Richard J. Kotis, Kent, Ohio  
Filed Oct. 9, 1961, Ser. No. 143,655  
4 Claims. (Cl. 43—42.24)

This invention relates to artificial fish lures.

One object of the invention is to provide an artificial lure which when retrieved in water will simulate the flexing or swimming action of a live minnow, and which will also have a lifelike feel to a fish grasping the lure in its mouth.

Another object of the invention is to provide a lure of the character described having improved, one-piece, hook and line attaching means embedded in a soft rubber-like body without substantially detracting from the aforesaid lifelike flexing action thereof, or the soft feel of the same, and also including an integral deflector plate which effectively controls the underwater movement of the lure.

Still another object of the invention is to provide a lure of the character described wherein the attaching means includes a simple, unobtrusive, elongated member provided with improved bonding and anchoring means for preventing movement thereof with respect to the soft rubber-like material of said body, such as might otherwise tend to separate the member from the body.

These and other objects of the invention will be manifest from the following brief description and the accompanying drawings.

Figure 1:
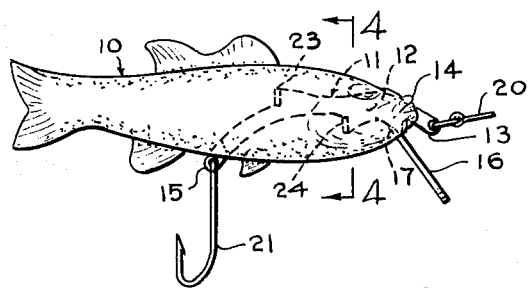
FIGURE 1 is a side elevation of a lure embodying the features of the invention.
Figure 2:
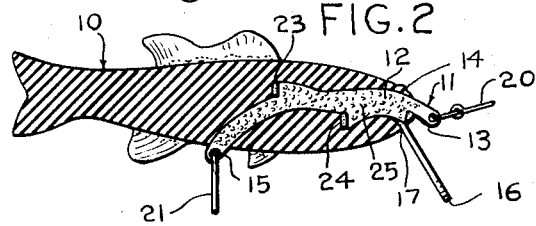
FIGURE 2 is a longitudinal cross-section vertically through the same to illustrate the improved hook and line attaching means.
Figure 4:
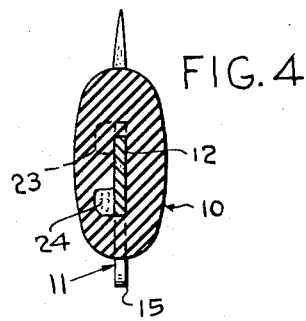
FIGURE 4 is an enlarged cross-section, taken substantially on the line 4—4 of FIGURE 1.
Figure 3:
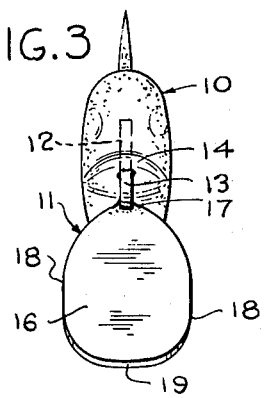
FIGURE 3 is an enlarged front end elevation, as viewed from the right of FIGURE 1.

Referring to the drawings generally, and FIGURES 1 to 4 in particular, the numeral 10 designates an elongated bait body of soft, flexible, elastic material, such as rubber or plasticized polyvinyl chloride, which may be vulcanized, cured or otherwise integrally molded to simulate a live minnow, for example (see FIGURES 1 and 3).

Integrally embedded in the body 10, during vulcanizing or molding thereof, there may be an elongated hook and line attaching member 11, formed by known stamping methods from a single piece of a thin relatively stiff or otherwise self-supportingly rigid metal such as brass or stainless steel. Member 11 may include a flat, narrow, generally arcuate plate 12 terminating in an apertured front line-attaching portion 13, which protrudes freely from the front or mouth end 14 of the body, and a hook-attaching portion 15 which protrudes freely from the underside of the body, centrally of the same. An enlarged integral extension 16 of the plate 12 is twisted at a reduced connecting portion 17 thereof, to lie in a plane which is at a forward and downward inclination to a horizontal plane through the body 10, below the line-attaching portion 13. The extension 16 has forwardly divergent, arcuate side edges 18, 18, and a substantially straight forward edge 19, to define a head plate or deflector plate of substantial breadth, designed to control the depth at which the lure may be drawn through the water by means of a line 20 attached to the apertured portion 13. A suitable gang hook 21 is shown attached to the apertured portion 15 in known manner.

The member 11 may be secured against possible loosening due to longitudinal movement thereof in either direction relative to the soft elastic material of the body, with continued use of the lure. To this end, a small integral lug 23 is bent from the upper edge of the plate 11, intermediate the terminal ends thereof, to extend in a vertical plane substantially at right angles to the vertical plane of the plate. A second small lug 24 likewise may be formed from the lower edge of plate 11 to extend at the same or the opposite side of the plate closer to the forward end, and similarly in a vertical plane. The lugs 23 and 24 are designed to prevent movement of the plate 11 in either direction with respect to the soft yielding body 10. In any event, the lugs 23 and 24 are securely embedded in the elastic material of the body by the molding method referred to above. The connecting portion 17 of the deflector plate, being embedded in the elastic material, also serves to restrict the aforesaid movement of the plate 11 in body 10. It will be seen by reference to FIGURES 2 and 4 that the plate 11 is proportioned with respect to the size of the body to surround the plate, including the anchoring lugs 23 and 24 thereon, with a maximum amount of the elastic material.

Figure 5:
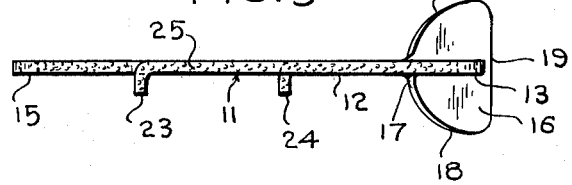
FIGURE 5 is an enlarged top plan view of the hook and line attaching means, apart from the lure body.

As a further aid to firm bonding of the plate 12 to the body 10, the surfaces of the plate which are embedded in the body may be precoated with adhesive material 25, such as a light yellow pigmented resin-based composition which bonds plastisols and organosols to a wide variety of materials, including cold rolled steel, aluminum, copper, brass, galvanized metal and alkyd enamels. One such coating manufactured by Dennis Chemical Co., Inc., is known as "Denflex" trademarked primer No. 2390-30. A coating 25 of said resin-based composition has been found to bond a plastisol body 10 tenaciously to a plate 12 stamped from sheet brass, for example. The adhesive coating 25 may have incorporated therein a multiplicity of discrete particles of a roughening material, such as sand, as indicated by means of pebbling in FIGURES 2, 4 and 5, thereby to increase the bonding effect between plate 12 and body 10.

In use of the lure, it is cast into the water in known manner, and retrieved by reeling in the line 20. The front deflector plate 16 causes the body to run deep in the water while the unreinforced portion of the body flexes or swims in the manner of a fingerling bass attractive to bigger fish.

Thus has been provided a unitary fish lure including a soft life-like body, hook and line attaching means, and a front deflector plate, and yet which may be economically produced from two parts.

The softness of the body 10 has, for good reason, been emphasized throughout the foregoing description by inclusion of such expressions as "soft rubber-like body"; "soft elastic material"; "soft yielding body"; and "soft life-like body". The term "soft" is well recognized to mean "Easily yielding to physical pressure; unresistent to molding, cutting, wear, etc." (Websters Collegiate Dictionary, Fifth Edition). It is readily apparent, moreover, that the soft, yielding, life-like consistency of the body is the principal reason for the present invention, which solves the problem of effectively anchoring a hook and line attaching means in a soft, yielding, rubber-like body, against relative longitudinal movement of the attaching means within the body, which might otherwise result in loosening or partial removal of the attaching means with respect to the body. By reference to FIGURES 1 to 4, it will be apparent that when a fish is caught, for example, the resultant tensional stress between the hook 21 and the line 20 is absorbed by the one-piece attaching plate 11, and that the body 10 is supported by the plate rather than conversely.

Modifications of the invention may be resorted to without departing from the spirit thereof or the scope of the appended claims.

What is claimed is:

1. An artificial fish lure, comprising: an elongated bait body having front and rear ends; said body being of molded, yieldingly soft, flexible elastic material; an elongated one-piece member of thin, self-supportingly rigid material embedded in said body longitudinally of the body with the plane of the member vertical therein; said member having integral rigid extensions providing line and hook attaching portions at the front and rear ends of the member, respectively, and a plurality of integral anchoring portions generally in planes extending laterally at substantial angles to said plane thereof; the elastic material of the body being anchoringly molded about the said anchoring portions; said anchoring portions having substantial surface areas presented in longitudinally opposing directions anchoringly to prevent relative movement of the member longitudinally in either direction with respect to the body; said line attaching portion projecting from the front end of the body; and the hook attaching portion projecting from the underside of the body substantially centrally thereof, whereby a substantial extent of the body rearwardly of said hook attaching portion is adapted to flex with respect to said member when the body is retrieved through water.

2. A fish lure as set forth in claim 1, said member having thereon a coating of adhesive material having bonding affinity for material of the body and for said member; said coating having embedded therein discrete particles of surface roughening material forming protrusions about which the material of the molded body is adhered.

3. An artificial fish lure as set forth in claim 1, said body being of spongy synthetic resin plastisol.

4. An artificial fish lure as in claim 1, said member having an integral enlarged forward portion twisted with respect to said plane of the member to provide a thin water-deflecting head plate extending freely below said line-attaching portion at an inclination forwardly and downwardly of the body.

References Cited by the Examiner

UNITED STATES PATENTS

| | | | |
|---|---|---|---|
| 1,644,652 | 10/27 | Kirschbraun | 156—276 |
| 1,777,004 | 9/30 | Lemere et al. | 43—42.24 |
| 1,813,722 | 7/31 | Wright et al. | 43—42.47 X |
| 1,819,147 | 8/31 | Bronson | 156—276 X |
| 1,908,537 | 5/33 | Pflueger | 43—42.47 X |
| 2,231,949 | 2/41 | Rinehart | 43—42.27 |
| 2,452,397 | 10/48 | Shotton | 131—225 |
| 2,570,100 | 10/51 | Collins | 43—42.09 |
| 2,612,716 | 10/52 | Hedland | 43—42.09 |
| 2,715,790 | 8/55 | Carpenter | 43—42.09 |
| 2,718,485 | 9/55 | Samuely | 156—283 |
| 2,836,922 | 6/58 | Cox | 43—44.2 |
| 2,847,791 | 8/58 | Simmons | 43—42.26 |
| 2,900,754 | 8/59 | Orlik | 43—42.47 X |
| 2,938,293 | 5/60 | Richardson | 43—42.24 |
| 3,070,917 | 1/63 | Rowe | 43—42.24 |

ABRAHAM G. STONE, *Primary Examiner.*

ALDRICH F. MEDBERY, *Examiner.*